United States Patent
Kothuvatiparambil et al.

(10) Patent No.: US 10,650,812 B2
(45) Date of Patent: May 12, 2020

(54) DETERMINISTIC MULTI-LENGTH SLIDING WINDOW PROTOCOL FOR CONTIGUOUS STRING ENTITY

(71) Applicant: Bank of America Corporation, Charlotte, NC (US)

(72) Inventors: Viju Kothuvatiparambil, Plano, TX (US); Maruthi Z. Shanmugam, Plano, TX (US); Donatus Asumu, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 150 days.

(21) Appl. No.: 16/101,734

(22) Filed: Aug. 13, 2018

(65) Prior Publication Data

US 2020/0051552 A1    Feb. 13, 2020

(51) Int. Cl.

| | |
|---|---|
| *G10L 15/197* | (2013.01) |
| *G10L 15/26* | (2006.01) |
| *G10L 15/30* | (2013.01) |
| *H04M 3/493* | (2006.01) |
| *H04M 3/51* | (2006.01) |

(Continued)

(52) U.S. Cl.
CPC ........ *G10L 15/197* (2013.01); *G06F 16/3344* (2019.01); *G06F 16/90344* (2019.01); *G06F 16/9535* (2019.01); *G06F 40/289* (2020.01); *G10L 15/26* (2013.01); *G10L 15/30* (2013.01); *H04M 3/4936* (2013.01); *H04M 3/5166* (2013.01); *H04M 2201/40* (2013.01)

(58) Field of Classification Search
CPC ........ G10L 15/197; G10L 15/26; G10L 15/30
See application file for complete search history.

(56) References Cited

U.S. PATENT DOCUMENTS

| | | | |
|---|---|---|---|
| 5,202,952 A | 4/1993 | Gillick et al. | |
| 7,774,197 B1 * | 8/2010 | Bulyko | G06F 40/216 704/9 |

(Continued)

OTHER PUBLICATIONS

Goncalves, Carlos, Joaquim F. Silva, and Jose C. Cunha. "An n-gram cache for large-scale parallel extraction of multiword relevant expressions with LocalMaxs." 2016 IEEE 12th International Conference on e-Science (e-Science). IEEE, 2016. (Year: 2016).*

(Continued)

*Primary Examiner* — Brian L Albertalli
(74) *Attorney, Agent, or Firm* — Weiss & Arons LLP; Michael A. Springs, Esq.

(57) ABSTRACT

A system for extracting verifiable entities from a user-utterance received on an automated calling service is provided. The system may include a receiver configured to receive a user-utterance, a processor and a non-transitory computer-readable media comprising computer-executable instructions. The processor may be configured to execute the instructions which, canonicalize the user-utterance into a plurality of tokens, determine the number of tokens of the user-utterance, and generate, using a sliding-window protocol, a comprehensive number of n-gram sequences from the user-utterance. The processor may be configured to process a plurality of threads of execution that may include a series of actions executed on the n-gram sequences to identify and extract verified entities from the user-utterance.

20 Claims, 10 Drawing Sheets

(51) Int. Cl.
    *G06F 16/33*       (2019.01)
    *G06F 16/9535*    (2019.01)
    *G06F 16/903*     (2019.01)
    *G06F 40/289*     (2020.01)

(56) References Cited

U.S. PATENT DOCUMENTS

| | | | |
|---|---|---|---|
| 8,370,143 B1 | 2/2013 | Coker | |
| 9,336,205 B2 | 5/2016 | Moilanen et al. | |
| 9,552,130 B2 | 1/2017 | Momchilov | |
| 9,646,604 B2 | 5/2017 | Erhart et al. | |
| 9,898,457 B1 | 2/2018 | Mohanty et al. | |
| 2002/0133346 A1* | 9/2002 | Kemble | G10L 15/19 704/257 |
| 2008/0255839 A1* | 10/2008 | Larri | G10L 15/10 704/238 |
| 2015/0193431 A1* | 7/2015 | Stoytchev | G16B 30/00 704/9 |
| 2017/0148431 A1* | 5/2017 | Catanzaro | G10L 15/197 |
| 2019/0095423 A1* | 3/2019 | Yang | G06F 40/289 |

OTHER PUBLICATIONS

"Sliding Window Protocol," Wikimedia Foundation, Inc., Apr. 8, 2018.
"N-Gram," Wikimedia Foundation, Inc., Apr. 11, 2018.

* cited by examiner

DETERMINISTIC MULTI-LENGTH SLIDING WINDOW PROTOCOL FOR CONTIGUOUS STRING ENTITY

FIELD OF TECHNOLOGY

Aspects of the invention relate to determining the subject matter received from a human utterance using a sliding window protocol.

BACKGROUND OF THE DISCLOSURE

Automated calling services use interactive voice response ("IVR") systems to recognize and discern a human utterance, and automatically provide information and/or direct a call based on the understanding of the human utterance.

Human utterances typically include an intent for the utterance, which may be the reason for the call. Included in the utterance, typically, are accompanying pieces of data that support the intent. The accompanying pieces of data are referred to herein as "entities."

It may be desirable to extract verifiable entities from the human utterance to improve performance of the IVR system, understand the meaning of the human utterance and enhance customer experience when interacting with the IVR system.

SUMMARY OF THE DISCLOSURE

Systems and methods for extracting verifiable entities from a user-utterance received on an interactive voice response ("IVR") system are provided. IVR systems are referred to herein, in the alternative, as an automated calling system. The method may include receiving a user-utterance. The method may further include canonicalizing the user-utterance into a plurality of tokens. The canonicalizing may be based on space. Each word in the user-utterance may utilize a single space. The method may further include determining the number of tokens of the user-utterance. The number of tokens may be the number of words in the user-utterance.

The method may further include generating, using a sliding-window protocol, a comprehensive number of n-gram sequences from the user-utterance. The total number of n-gram sequences generated may be equal to the number of determined tokens. Each n-gram sequence may include a window-size equal to a value of n in the n-gram sequence.

The method may further include retrieving and processing each n-gram within each n-gram sequence, preferably contiguously, for extracting verifiable entities. The processing contiguously may not lengthen the computation time significantly for a user-utterance that may be less than or equal to thirty tokens. The processing contiguously may enable extraction of entities at approximately more than 99% accuracy.

The method may include retrieving a first n-gram from each n-gram sequence. The method may further include processing, in parallel, a plurality of threads of execution. One thread of execution, from the plurality of threads of execution, may be executed for each n-gram sequence. Each n-gram sequence may be processed in descending order of n-gram sequences. When processing in descending order and more than one n-gram is successfully verified, the longest n-gram may be selected and stored as an entity.

The processing of the plurality of threads of execution may include a series of actions on the comprehensive n-gram sequences. The first step within the series of actions may include determining the first n-gram or a subsequent n-gram to be verifiable. The verifying may be to determine if the n-gram is a noun.

In the event that the first n-gram or the subsequent n-gram is not determined to be verifiable, the method may further include, retrieving the subsequent n-gram from each n-gram sequence. When the subsequent n-gram is retrieved, the method may further include repeating the series of actions for the subsequent n-gram at the first step.

When the first n-gram or the subsequent n-gram is determined to be a noun, the method may further include a second step. The second step may include searching, in a database of stored entity-verifiers, for an entity-verifier associated with the verified n-gram.

In the event that an entity-verifier associated with the verified n-gram is not found in the database, the method may further include retrieving the subsequent n-gram from each n-gram sequence. The method may further include repeating the series of actions on the subsequent n-gram at the first step.

An entity-verifier associated with the verified n-gram may be found in the database. In response to the finding and/or identification of an entity-verifier associated with the verified n-gram, the method may further include a third step. The third step may include invoking the entity-verifier on the verified n-gram. The invoking may be used to determine the n-gram as a valid entity.

In the event that the n-gram is not determined to be a valid entity, the method may further include retrieving the subsequent n-gram from each n-gram sequence. The method may further include repeating the series of actions on the subsequent n-gram at the first step.

When the n-gram is determined to be a valid entity, the method may further include a fourth step. The fourth step may include transmitting the valid entity to an entity assembler.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
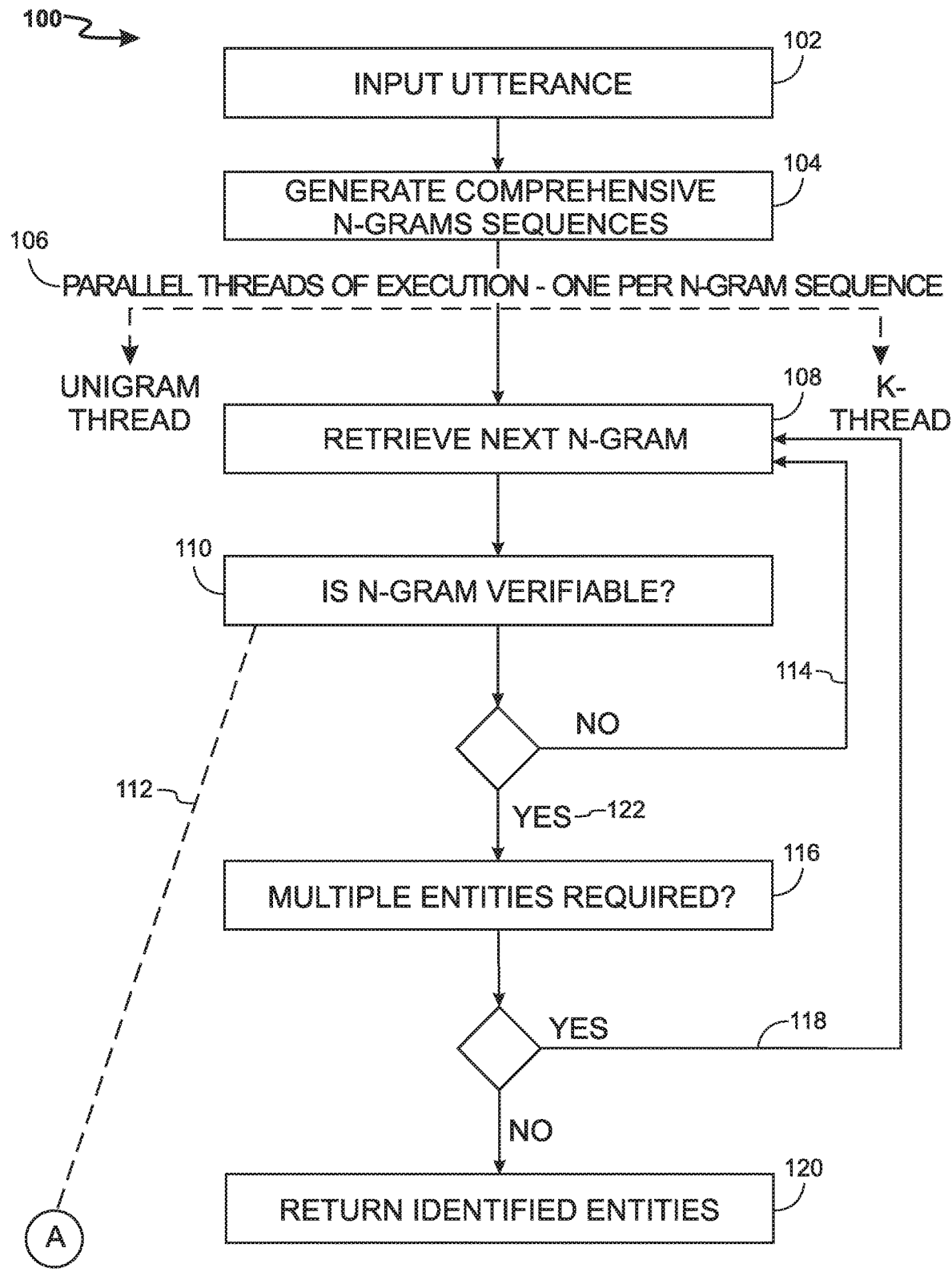
FIG. 1 shows an illustrative flowchart in accordance with principles of the invention.

User-utterances received by an automated calling system may include a user-request. The request may include a request for information. The request may include a request to be directed to a system agent. The request may include a request for data associated with a user account.

The request may further include an unverbalized intent of the request. The intent may embody the underlying purpose, in one or two words, of the user in placing the request. The intent of the call may have different implications. The implication may depend, at least in part, on the domain associated with the request. The domain may be associated with banking, medicine, law or any other suitable domain. The intent of the request may significantly differ in meaning depending on the domain with which the request may be associated with. Entities within the user-utterance may be the supporting data for the intent. Entities, as mentioned above, refer to the accompanying pieces of data that support the intent. By extracting verifiable entities from the user-utterance, the unverbalized intent may be more defined and a more accurate response to the request may be provided.

A system for extracting verifiable entities from a user-utterance is provided. The user-utterance may be received by an automated calling service. The system may include a receiver. The receiver may be configured to receive the user-utterance. The user-utterance may include an intent of the utterance and one or more entities supporting the intent. In one embodiment, the system may be configured to identify the intent of the utterance. The system may include system-defined entities that may be associated with each intent. The system in this embodiment may be configured to determine valid-entities from the user-utterance, based on the system-defined entities associated with the received intent. In another embodiment, the system may include entities that may be pre-defined by users of the system. System-defined entities and user-defined entities may be defined as, but are not limited to, one or more of a pronoun, a denomination, a numerical value and a date.

The system may also include a processor. The system may further include a non-transitory computer-readable media. The non-transitory computer-readable media may include computer-executable instructions. The processor may be configured to execute the instructions to canonicalize the user-utterance into a plurality of tokens.

The processor may be further configured to execute the instructions to determine the number of tokens of the user-utterance. Each word in the utterance may be counted as one token. For example, a user-utterance that includes four words may be determined to have 4 tokens. There may be four n-gram sequences generated for the user-utterance. The n-gram sequences may include a unigram, a bigram, a trigram and a quadgram.

The first n-gram sequence may be a unigram sequence. The unigram sequence may include the user-utterance divided into single tokens. Each token may include a single word. The window size for a unigram sequence may be the size of a single word. The second n-gram sequence may be the bigram sequence. The bigram sequence may be a sequence where the tokens are grouped in units of two. The window size for a bigram sequence may be the size of two words. A third n-gram sequence may be the trigram sequence. The trigram sequence may be a sequence where the tokens are grouped in units of three. The window size for a trigram sequence may be the size of three words. A fourth n-gram sequence may be the quadgram sequence. The quadgram sequence may be a sequence where the tokens are grouped in units of four.

A user utterance typically may be a plurality of words that a user may recite in one sentence. The user-utterance typically does not exceed thirty words. For the most effective and efficient implementation of the embodiment disclosed herein, the number of determined tokens of the user-utterance may be limited to 30 tokens. By limiting the number of words to thirty words, the system may be enabled to go through, contiguously, each and every n-gram, and determine for each n-gram, the validity as an entity, without increasing the compute time significantly. When the number of determined tokens of the user-utterance exceeds thirty words, the system may further include a transceiver configured to transmit a request to a user to repeat and reduce the number of words in the user-utterance. The transceiver may be further configured to receive the repeated user-utterance.

The processor may be further configured to execute the instructions to generate, using a sliding-window protocol, a comprehensive number of n-gram sequences from the user-utterance. The number of n-gram sequences may be equal to the number of determined tokens. Each n-gram sequence may include a window-size equal to a value of n in the n-gram sequence.

The processor may be configured to retrieve a first n-gram from each n-gram sequence. The processor may be further configured to process in parallel, a plurality of threads of execution. By executing the n-gram sequences in parallels, the turnaround time for extracting entities from the comprehensive n-gram sequences of the user-utterance may be faster.

One thread of execution may be executed, from the plurality of threads of execution, for each n-gram sequence. The process of the plurality of threads of execution may include a series of actions. The series of actions may be performed on the comprehensive n-gram sequences.

A first step from the series of actions may be to determine if the first n-gram or a subsequent n-gram may be verifiable. The first step may be to verify the n-gram as a noun. In the event that the first n-gram or the subsequent n-gram may not be determined to be verifiable, the processor may be configured to retrieve the subsequent n-gram from each n-gram sequence. The processor may be further configured to repeat the series of actions for the subsequent n-gram at the first step.

The n-gram may be determined to be verifiable as a noun. When the n-gram is determined to be a noun, the processor may be configured to search, in a database of stored entity-verifiers, for an entity-verifier associated with the verified n-gram. The database may include a list of a plurality of entity-verifiers. An entity-verifier may be a verifier for an n-gram including a date. The date entity verifier may include a set of parameters that may be associated with a date. In one example, an n-gram including a date may be received as a complete alpha-numeric string, i.e.—Jun. 6, 2017. In another example, an n-gram including a date may be received as Jun. 6, 2017.

An entity-verifier may be a verifier for an n-gram including a denomination. The denomination entity verifier may include a set of parameters that may be associated with a denomination. The parameters may include a numerical value. An entity-verifier may be a verifier for an n-gram including a pronoun, i.e.—a name of a person.

When an entity-verifier associated with the verified n-gram is not found in the database, the processor may be configured to retrieve the subsequent n-gram from each n-gram sequence. The processor may be further configured to repeat the series of actions on the subsequent n-gram at the first step.

When an entity-verifier associated with the verified n-gram is found in the list of stored entity-verifiers in the database, the processor may be configured to invoke the entity-verifier on the verified n-gram. The invoking may be to determine the n-gram as a valid entity. The processor may perform a check on the n-gram to check if the n-gram is a valid match to the stored entity-verifier that may be determined to be associated with the n-gram.

When the n-gram is not determined to be a valid entity, the processor may be configured to retrieve the subsequent n-gram from each n-gram sequence. The processor may be further configured to repeat the series of actions at the first step for the subsequent n-gram.

When the n-gram is determined to be a valid match, the n-gram may be a valid entity. The n-gram may be transmitted to an entity assembler. The entity assembler may be configured to save each valid entity. The one or more valid entities may be used to provide an accurate response to the user-utterance. The one or more valid entities may be transmitted to a response system that may use the valid entity(s) along with other determined data to correctly and accurately respond to a user-utterance.

In certain embodiments, when an n-gram is determined to be a valid entity, the processor may be further configured to determine if the n-gram is linked with a subsequent n-gram as a multiple entity. In response to the determination that the n-gram is linked to the subsequent n-gram, the processor may be further configured to retrieve the subsequent n-gram from the n-gram sequence. The processor may further verify the n-gram coupled with the subsequent n-gram to be a valid multiple entity.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative flowchart of entity-verifier system 100. System 100 may include steps in a process for determining and extracting entities from a user-utterance. At step 102, the system may be configured to receive input of a user-utterance. The system may then be configured to generate comprehensive n-gram sequences from the inputted user-utterance, as shown at step 104. At 106, the system may run parallel threads of execution on the n-gram sequences. There may be a thread of execution running on a unigram sequence. There may be a thread of execution running on each n-gram sequence generated. At step 108, the system may be configured to retrieve a first, or the next n-gram from each n-gram sequence. At the next step 110, the n-gram may be reviewed to determine verifiability. The n-gram, according to this embodiment, may be checked to determine whether it is a noun. If it is not a noun, as shown at 114, the n-gram may not be considered to be an entity. System 100 may be configured to repeat step 108 on the next n-gram. At step 110, if the n-gram is a noun, a plurality of steps may be performed for verifying the n-gram as a valid entity. The plurality of n-gram verifier steps may be shown in more detail at FIG. 2.

When the n-gram is determined to be a valid entity, an additional step at 116 may be performed. Step 116 may determine if the valid entity is coupled with a subsequent n-gram as a multiple entity. At step 118 a subsequent n-gram may be retrieved to determine if the subsequent n-gram is coupled to a previous n-gram. For example, an utterance may include a dollar amount of $50 to $100. Both the n-gram $50 and the n-gram $100 may be entities.

The $50 and the $100 may be considered multiple entities and may be treated as a single entity. The single valid entity may be the range of $50 to $100. The valid entity may then be returned to an entity assembler at step 120. In another example, a user-utterance may include an account number or a telephone number. They may be canonicalized into three tokens i.e.—123|456|789. When the system retrieves these tokens in a unigram sequence, each single word may be verified as an entity. The system may perform a multiple entity check and determine the subsequent two n-grams to be a multiple entity. In this example, the system may be configured to link the three single n-grams as one single entity.

When the valid entity is not a multiple entity, step 118 may not be performed, and the valid entity may then be transmitted to the entity assembler at step 120.

Figure 2:
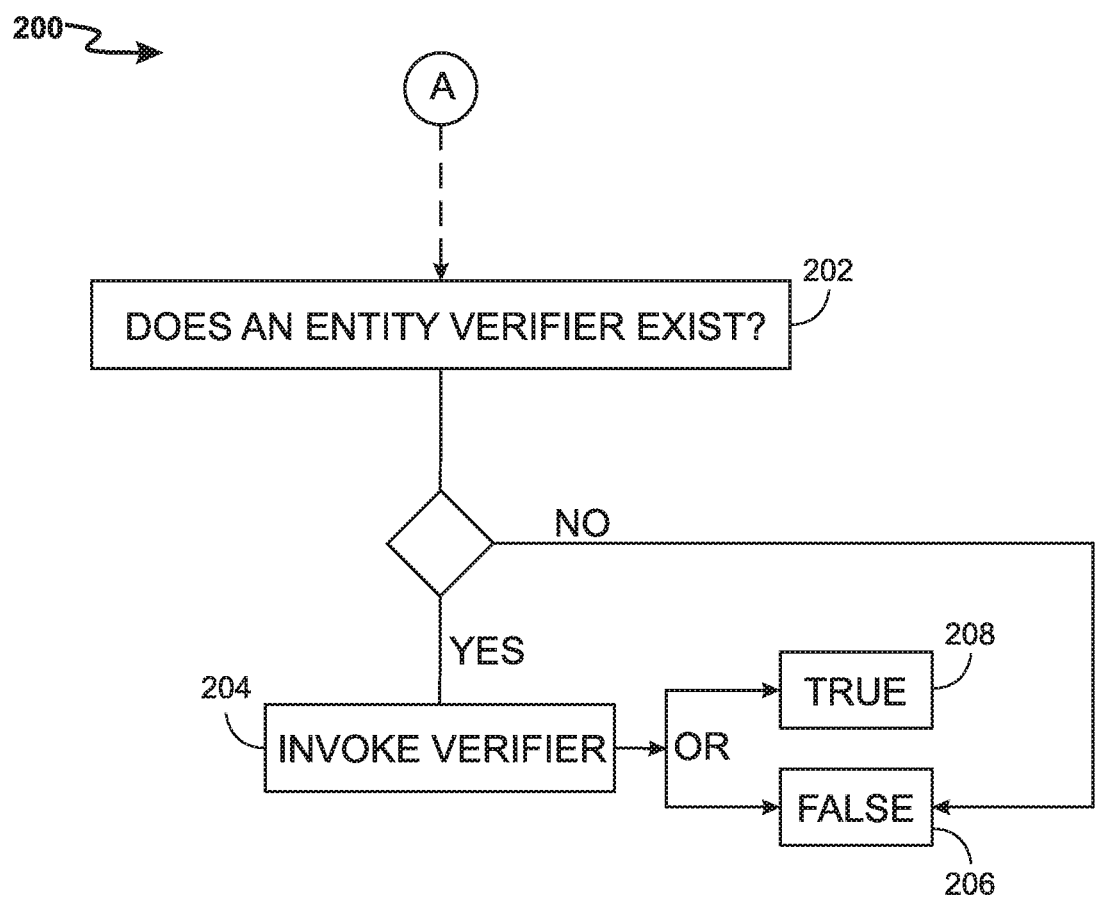
FIG. 2 shows another illustrative flowchart in accordance with principles of the invention.

FIG. 2 shows illustrative n-gram verifier sub-system 200 within entity verifier system 100. N-gram verifier 200 may further verify each n-gram following the determination that the n-gram is a noun, as shown at step 110 of FIG. 1. At step 202 the n-gram verifier may determine if there is an entity-verifier that may be associated with the n-gram.

There may be a list of entity-verifiers stored in a database. The entity-verifier list may be a pre-determined list stored in the database. The entity-verifier list may be a list of entity-verifiers based on machine learning. The machine learning may be based on previous utterances received from a user. The system may be configured to store entities extracted from an utterance associated with a user and may further be configured to use the stored entities for verification on subsequent utterances received from the same user.

There may be an entity-verifier for verifying a string of characters. There may be an entity-verifier for verifying an n-gram including a numerical value. The numerical value may be an amount of money. There may further be an entity-verifier for verifying an n-gram that may include a date.

When one of the entity-verifiers stored in the database is determined to be associated with the n-gram, the verifier may be invoked at step 204. An algorithm may be performed on the determined entity-verifier. When the algorithm returns a value equal to true at step 208, the n-gram may be determined to be a valid entity. The n-gram verifier may return a value of true and the entity-verifier system 100 may proceed at step 122 of FIG. 1.

FIGS. 3-9 show illustrative diagrams of an example of the steps taken to extract one or more valid entities from a user-utterance received on an automated calling system. In this example, verifiable entities may be pre-determined by the system as a word(s) with a numerical value, a data, and/or a denomination.

Figure 3A:
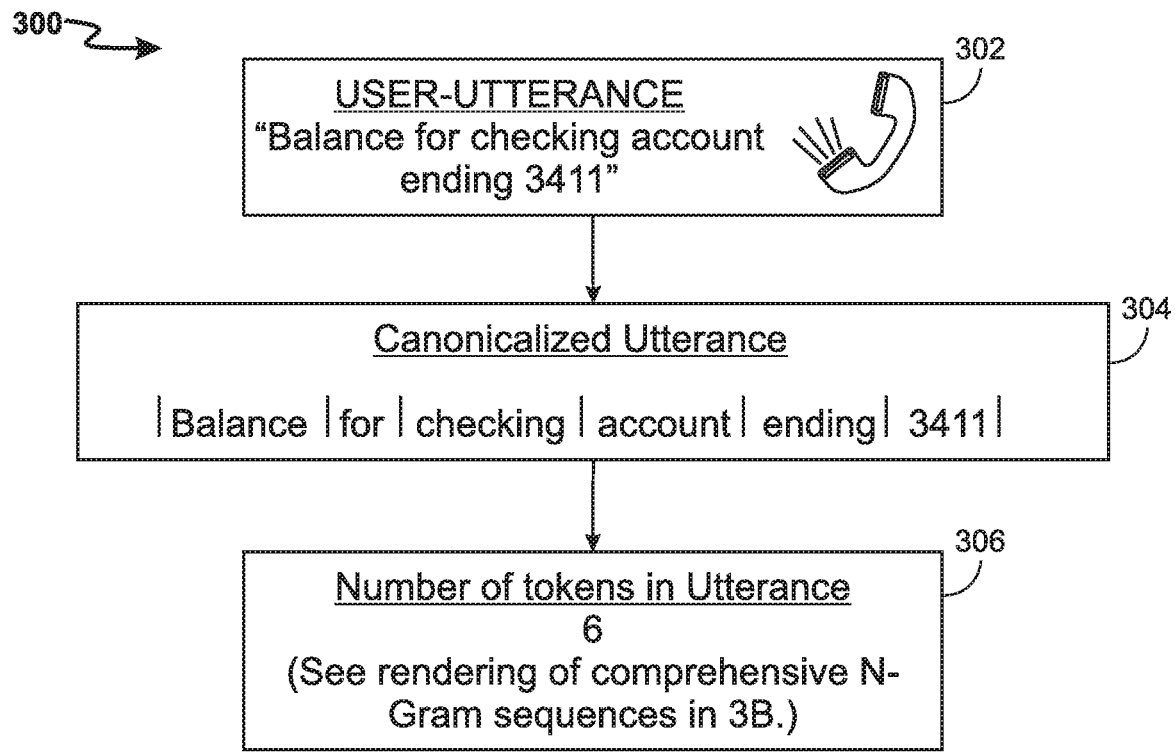
FIG. 3A shows an illustrative diagram in accordance with principles of the invention.

FIG. 3 shows illustrative diagram 300. Diagram 300 shows the generating of the comprehensive n-gram sequences based on a user-utterance. The user-utterance 302 may be an example of a user-utterance. The generating of n-gram sequences may be for extracting verifiable entities from the user-utterance.

A user may input an utterance to an automated calling system. The inputted user-utterance, as shown at 302, may be for example, "Balance for checking account ending 3411." The utterance may include one or more words. The utterance may be split into single words as shown at 304. Each word may be considered a single token. The number of tokens included in the utterance may be determined, as shown at 306. In this example, there are six words in the utterance and the number of determined tokens therefore is 6. There may be 6 n-gram sequences generated based on the user-utterance. There may be a unigram sequence, a bigram sequence, a trigram sequence, a quadgram sequence, a pentagram sequence and a hexagram sequence. All six n-grams may be shown at 308.

Unigram sequence 310 may be a sequence including single token n-grams. For example, the single word "balance" may be the first n-gram within the unigram sequence, as shown at 312. Each n-gram within the unigram sequence may be referred to as a 1-gram. Bigram sequence 314 may be a sequence including two-word tokens for each n-gram in the bigram sequence. Each n-gram within the bigram sequence may be referred to as a 2-gram. An example of a bigram may be shown at 316. The 2-gram may include the words "Balance for" as the first 2-gram of the bigram sequence. Trigram sequence 318 may be a sequence including three-word tokens for each n-gram in the trigram sequence. An example of a trigram may be shown at 320. A 3-gram may include the words "Balance for checking" as the first 3-gram of the trigram sequence. Quadgram 322 may be a sequence including four-word tokens for each n-gram in the quadgram sequence. An example of a quadgram may be shown at 324. A four-gram may include the words "Balance for checking account" as the first 4-gram of the quadgram sequence. Pentagram sequence 326 may be a sequence including five-word tokens for each n-gram in the pentagram sequence. An example of a pentagram may be shown at 328. A 5-gram may include the words "Balance for checking account ending" as the first 5-gram of the pentagram sequence. Hexagram 330 may be a sequence including six-word tokens for each n-gram in the hexagram sequence. An example of a hexagram may be shown at 332. A 6-gram may include the complete utterance of "Balance for checking account ending 3411" as the 6-gram of the hexagram sequence.

Figure 3B:
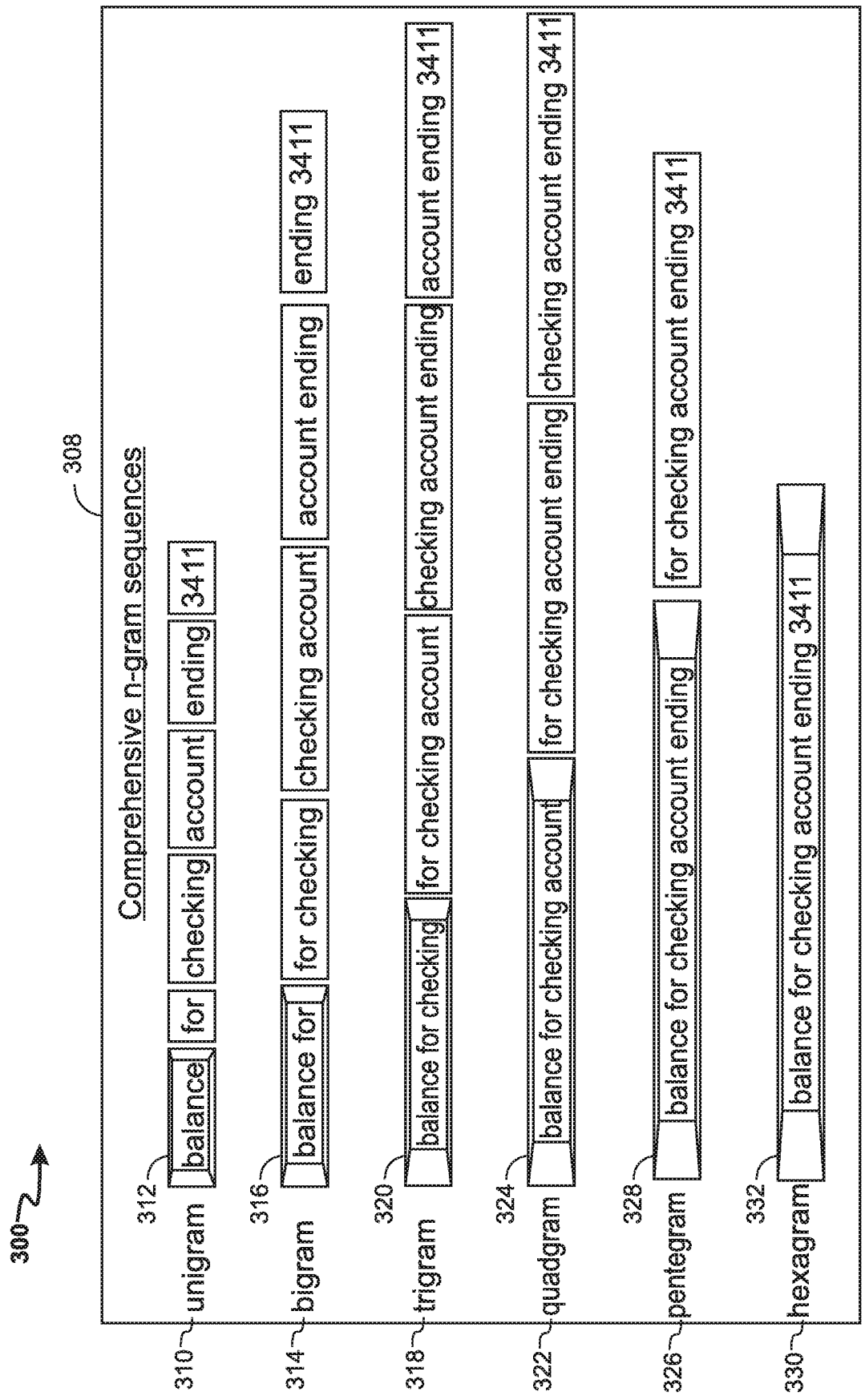
FIG. 3B shows an illustrative diagram in accordance with principles of the invention.
Figure 4:
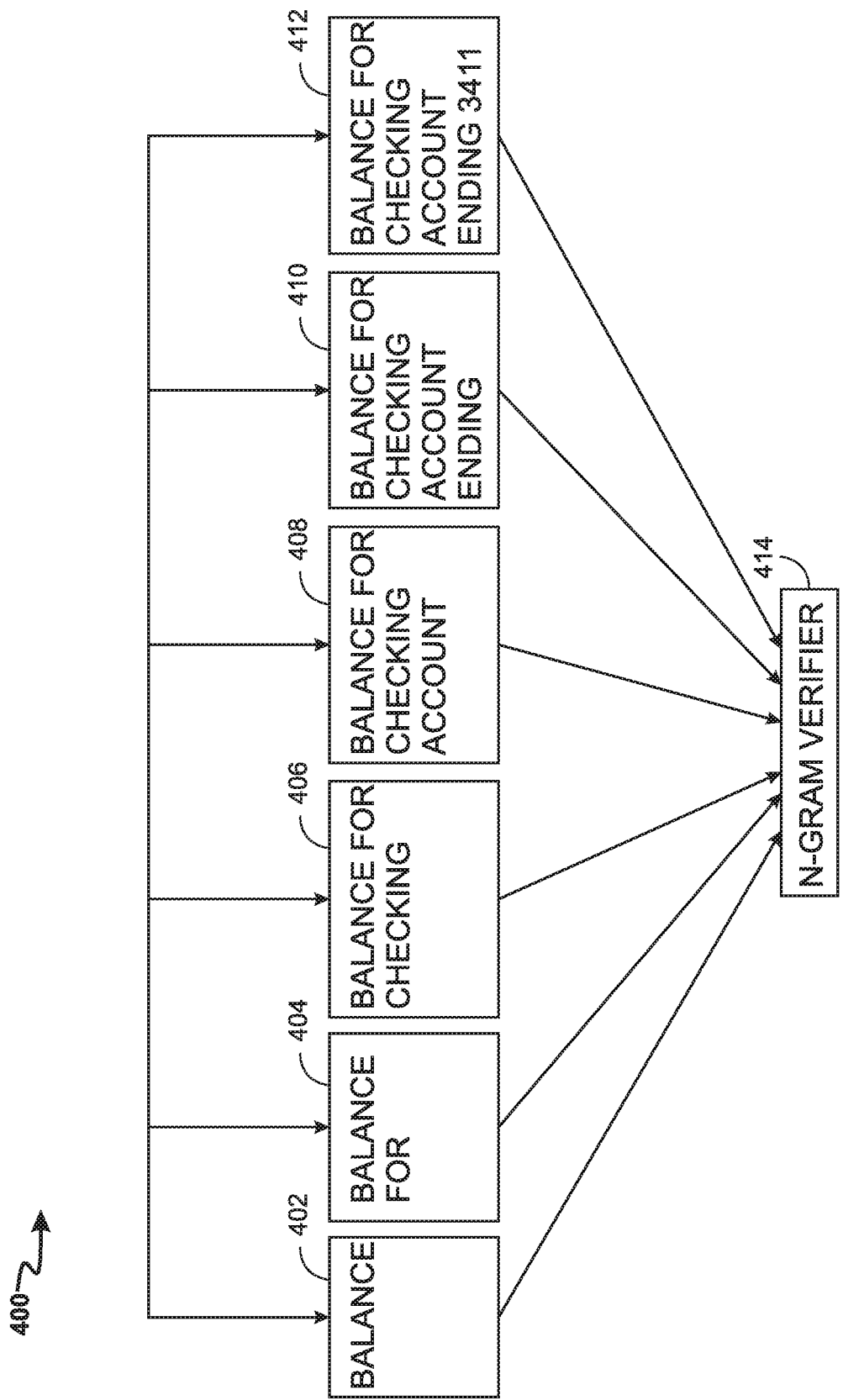
FIG. 4 shows another illustrative diagram in accordance with principles of the invention.

FIG. 4 shows illustrative diagram 400 of the first n-gram from each n-gram sequence shown in FIG. 3B. Diagram 400 may include six n-grams, one from each n-gram sequence. A sliding window protocol may be implemented on the n-gram sequences. The sliding window protocol may be used to extract each n-gram and then feed each n-gram from each n-gram sequence to the n-gram verifier for entity verification.

Each sequence has a window size equal to the value of n in the associated n-gram. A window-size of one token may be used to slide across unigram sequence 310 (shown in FIG. 3). The first n-gram "Balance," from the unigram sequence, the size of one token, may be extracted as shown at 402. A window-size of two tokens may be used to slide across bigram sequence 314 (shown in FIG. 3). The first n-gram "for," from the bigram sequence 314, the size of two tokens, may be extracted as shown at 404. A window-size of three tokens may be used to slide across trigram sequence 318 (shown in FIG. 3). The first n-gram "checking", from the trigram sequence 318, the size of three tokens, may be extracted as shown at 406. A window-size of four tokens may be used to slide across quadgram sequence 322 (shown in FIG. 3.) The first n-gram "account", from the quadgram sequence 322, the size of four tokens, may be extracted as shown at 408. A window-size of five tokens may be used to slide across pentagram sequence 326 (shown in FIG. 3). The first n-gram "ending", from the pentagram sequence 326, the size of five tokens, may be extracted as shown at 410. A window-size of six tokens may be used to slide across hexagram sequence 330 (shown in FIG. 3). The first n-gram "3411", from the hexagram sequence 330, the size of six tokens, may be extracted as shown at 412. N-grams 402, 404, 406, 408, 410 and 412 may be fed through n-gram verifier 414 for entity verification.

In certain embodiments, n-gram verification for each of n-grams 402-412 may have approximately the same computation time and may be completed substantially simultaneously. Following completion of the n-gram verification, the window may slide horizontally on each n-gram sequence, based on the window-size of the n-gram sequence, and retrieve the subsequent n-gram from each n-gram sequence.

In other embodiments, n-gram verification for each of n-grams 402-412 may not have the same computation time. There may be a different computation time for each n-gram. In this embodiment, a subsequent n-gram following the n-grams that may have completed verification may be retrieved. Concurrently, the n-grams that may have a longer computation time may still undergo verification. Each thread of execution may run in parallel. Each thread of execution may be completed at a different time.

Figure 5:
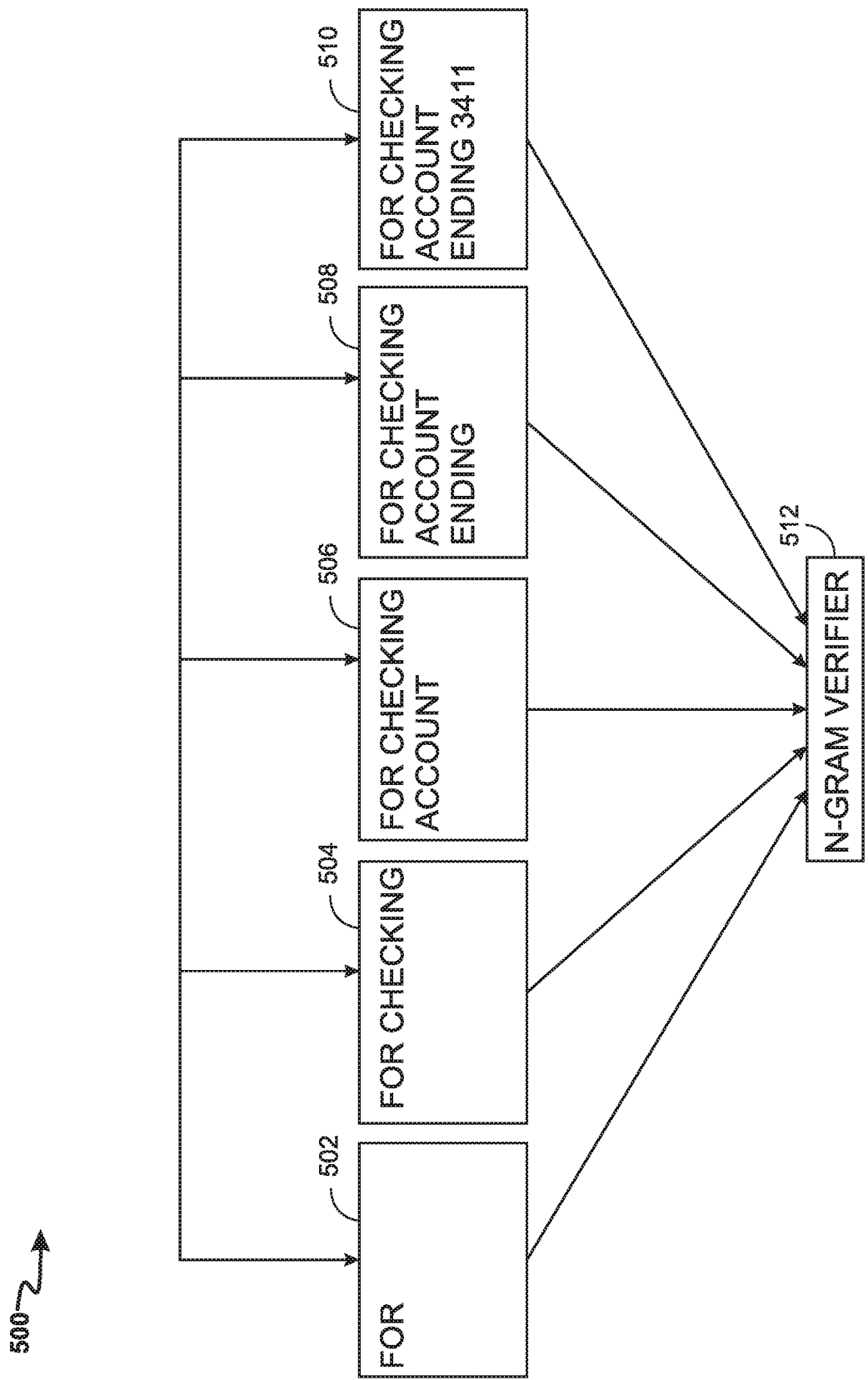
FIG. 5 shows another illustrative diagram in accordance with principles of the invention.

FIG. 5 shows illustrative diagram 500 of the second n-gram from n-gram sequence 310, 314, 318, 322 and 326 (shown in FIG. 3B.) N-grams 502-510 may be retrieved from n-gram sequences 310, 314, 318, 322 and 326. Each of n-grams 502-510 may be the second n-gram from the associated n-gram sequence. Each of n-grams 502-510 may be transmitted to n-gram verifier 512. N-gram verifier 512 may be configured to extract the n-grams that may be valid entities.

Figure 6:
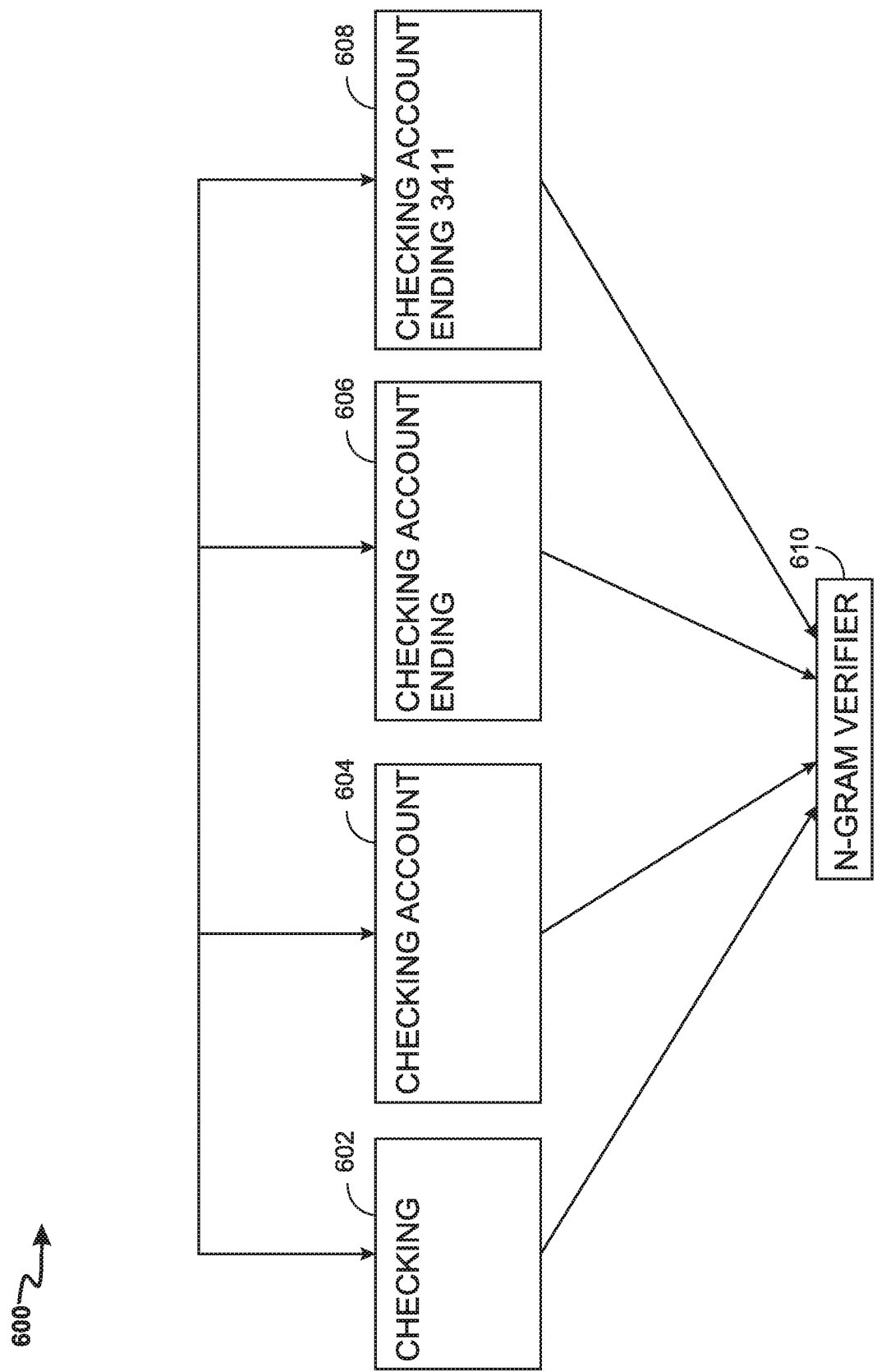
FIG. 6 shows another illustrative diagram in accordance with principles of the invention.

FIG. 6 shows illustrative diagram 600 of the third n-gram from n-gram sequences 310, 314, 318 and 322 (shown in FIG. 3B.) N-grams 602-608 may be retrieved from n-gram sequences 310, 314, 318 and 322. Each of n-grams 602-608 may be the third n-gram from the associated n-gram sequence. Each of n-grams 602-608 may be transmitted to n-gram verifier 610. N-gram verifier 610 may be configured to extract the n-grams that may be valid entities.

Figure 7:
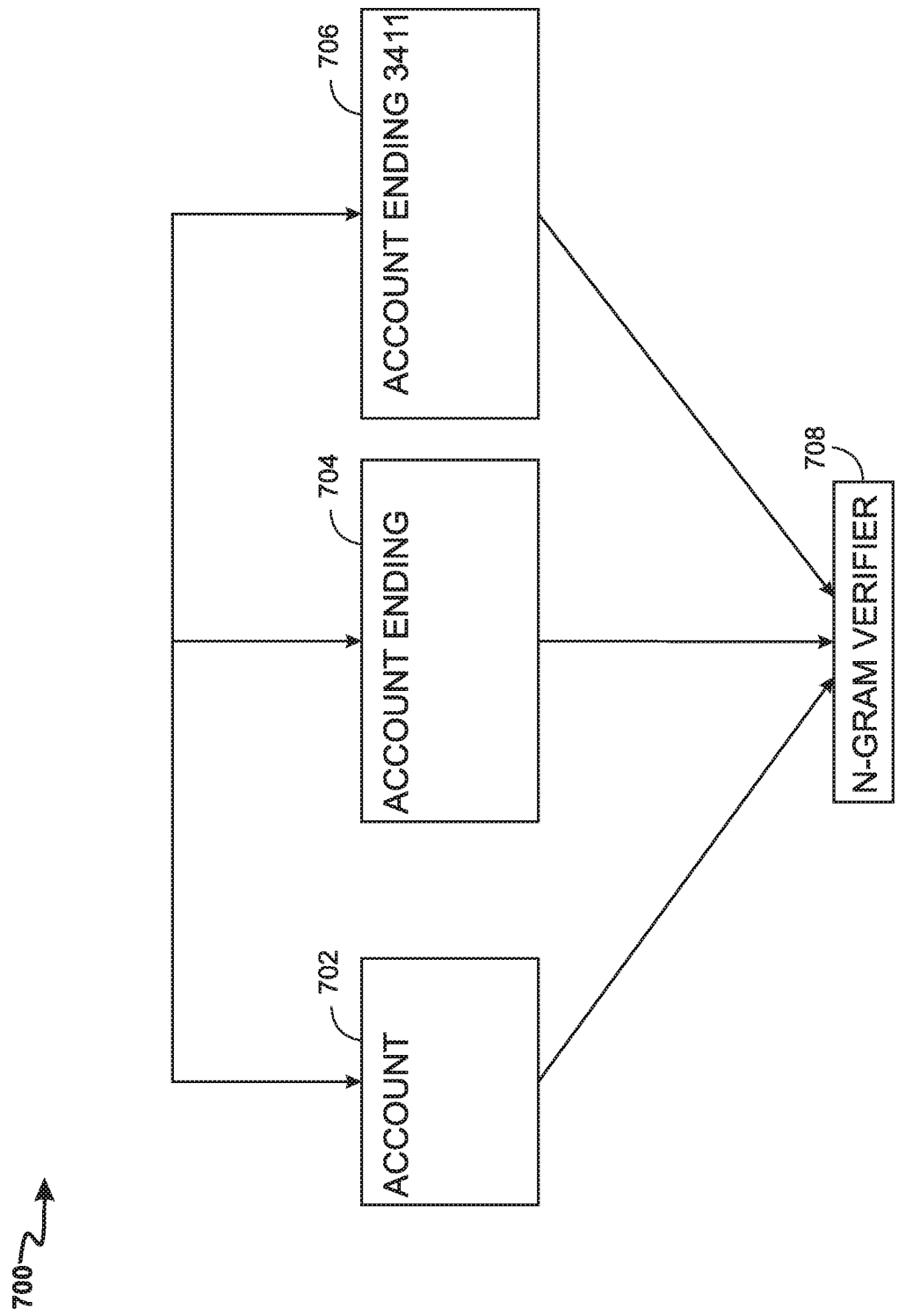
FIG. 7 shows another illustrative diagram in accordance with principles of the invention.

FIG. 7 shows illustrative diagram 700 of the fourth n-gram from n-gram sequences 310, 314, and 318 (shown in FIG. 3B.) N-grams 702-706 may be retrieved from n-gram sequences 310, 314 and 318. Each of n-grams 702-706 may be the fourth n-gram from the associated n-gram sequences. Each of n-grams 702-706 may be transmitted to n-gram verifier 708. N-gram verifier 708 may be configured to extract the n-grams that may be valid entities.

Figure 8:
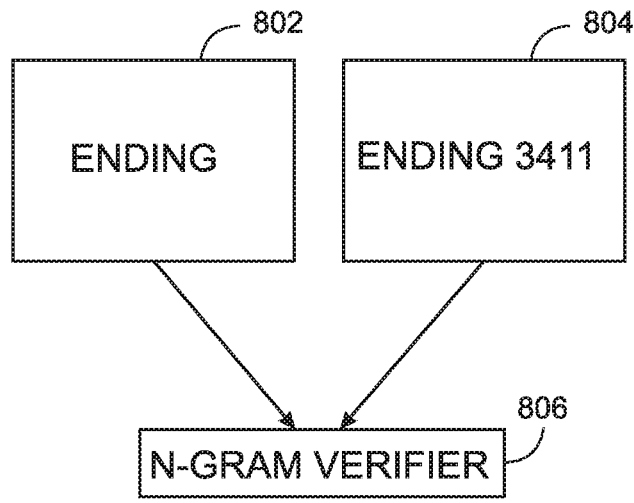
FIG. 8 shows another illustrative diagram in accordance with principles of the invention.

FIG. 8 shows illustrative diagram 800 of the fifth n-gram from n-gram sequences 310 and 314 (shown in FIG. 3B.) N-grams 802 and 804 may be retrieved from n-gram sequences 310 and 314. N-grams 802 and 804 may be the fifth n-gram from n-gram sequences 310 and 314. N-grams 802 and 804 may be transmitted to n-gram verifier 806. N-gram verifier 806 may be configured to extract the n-grams that may be valid entities.

Figure 9:
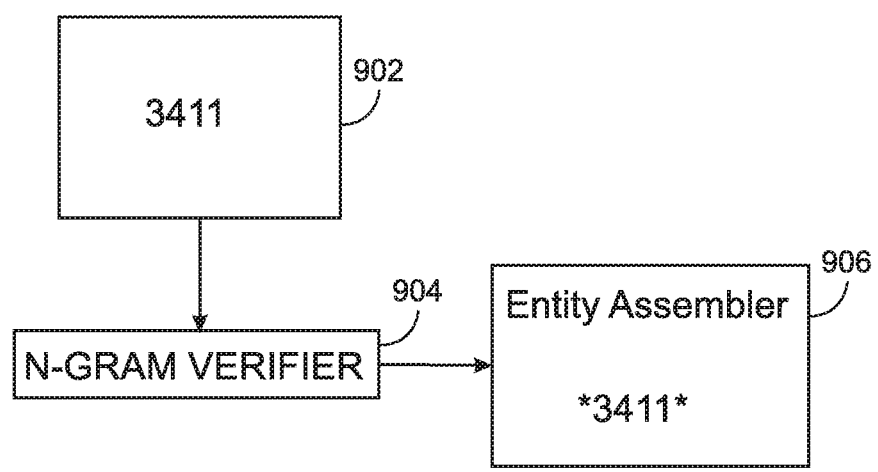
FIG. 9 shows another illustrative diagram in accordance with principles of the invention.

FIG. 9 shows illustrative diagram 900 of the sixth n-gram from n-gram sequence 310 (shown in FIG. 3B.) N-gram sequence 310 may be the unigram sequence. The unigram sequence may be split into single tokens and may be the final sequence to complete entity verification. In this example of the user utterance, "Balance for checking account ending 3411", the valid-entity determined is "3411." The n-gram may be verified at n-gram verifier 904. The n-gram verifier may include an entity verifier. The entity verifier, in this example, determines whether the n-gram has a numerical value, a denomination and/or a date. "3411" as shown at 902, has a numerical value and therefore may be considered an entity. The valid entity "3411" may be transmitted to the entity assembler 906.

Figure 10:
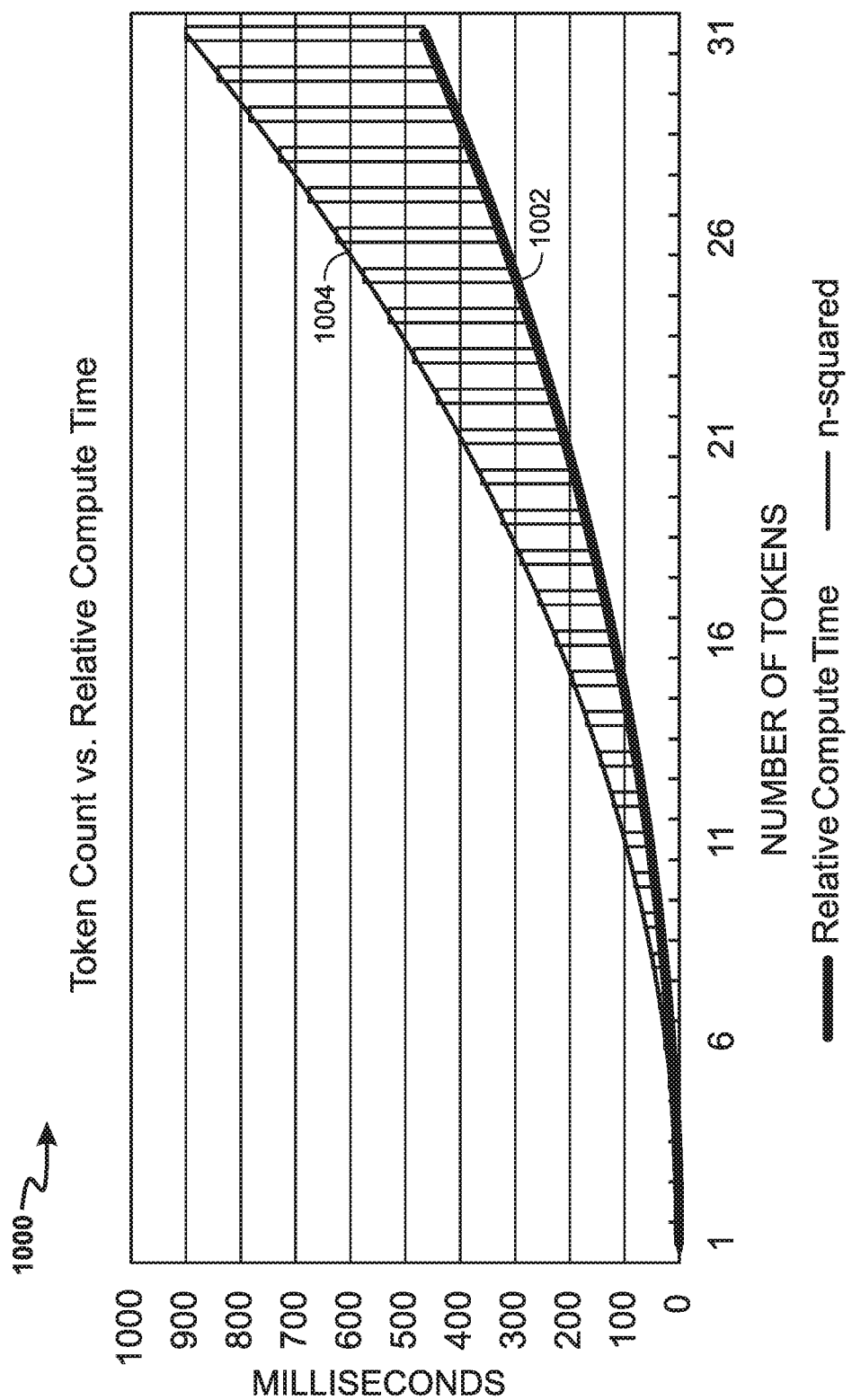
FIG. 10 shows an illustrative graph in accordance with principles of the invention.

FIG. 10 shows illustrative graph 1000. Graph 1000 may show a comparison graph. The comparison may compare computation times of two distinct algorithms. Line 1002 may be graphed based on a first algorithm. The first algorithm may be $n(n-1)/2$, wherein n is the number of tokens in an utterance. It should be appreciated that the system may not need to traverse all of the tokens in an utterance before it completes review of all comprehensive n-gram sequences included in the utterance. The second algorithm may be n-squared, wherein n is the number of tokens in the utterance. It should be appreciated that the system may need to traverse all of the tokens in the utterance in order to retrieve all valid entities. It should be further appreciated that the difference between the two lines is not relatively significant until the total token count exceeds thirty tokens. Therefore, in the event that an entity verification module utilizes the second algorithm (n-squared) as opposed to the first algorithm ($n(n-1)/2$), to traverse the tokens in the utterance, a relatively significant time difference may not be realized by the system or the user unless the word count of the utterance exceeds approximately thirty.

Thus, methods and apparatus for extracting verifiable entities from a user-utterance have been provided. Persons skilled in the art will appreciate that the present invention can be practiced by other than the described embodiments, which are presented for purposes of illustration rather than of limitation. The present invention is limited only by the claims that follow.

What is claimed is:

1. A method for extracting verifiable entities from a user-utterance received on an automated calling service, the method comprising:
   receiving a user-utterance;
   canonicalizing the user-utterance into a plurality of tokens;
   determining the number of tokens of the user-utterance;
   generating, using a sliding-window protocol, a comprehensive number of n-gram sequences from the user-utterance, the number of n-gram sequences equal to the number of determined tokens, each n-gram sequence including a window-size equal to a value of n in the n-gram sequence;
   retrieving a first n-gram from each n-gram sequence;
   processing, in parallel, a plurality of threads of execution, one thread of execution, from the plurality of threads of execution, for each n-gram sequence, the processing of the plurality of threads of execution comprising a series of actions on the comprehensive n-gram sequences including:
      determining the first n-gram or a subsequent n-gram to be verifiable, said verifiable verifying the n-gram including a noun;
      in the event that the first n-gram or the subsequent n-gram is not determined to be verifiable, the method further comprising, retrieving the subsequent n-gram from each n-gram sequence and repeating the series of actions for the subsequent n-gram;
      searching, in a database of stored entity-verifiers, for an entity-verifier associated with the verified n-gram;
      in the event that an entity-verifier associated with the verified n-gram is not found in the database, the method further comprising, retrieving the subsequent n-gram from each n-gram sequence and repeating the series of actions on the subsequent n-gram;
      invoking the entity-verifier on the verified n-gram to determine the n-gram to be a valid entity;
      in the event that the n-gram is determined not to be a valid entity, the method further comprising retrieving the subsequent n-gram from each n-gram sequence and repeating the series of actions on the subsequent n-gram; and
   transmitting the valid entity to an entity assembler.

2. The method of claim 1 wherein the noun is a pronoun.

3. The method of claim 1 wherein the comprehensive n-gram sequences comprises a unigram sequence, a bigram sequence and a trigram sequence.

4. The method of claim 1 further comprising an n-gram sequence where an n-gram value of the n-gram sequence is equal to the determined number of tokens in the user-utterance.

5. The method of claim 1 wherein the processing in parallel the threads of execution further comprises, processing each n-gram in descending order of n-gram sequences.

6. The method of claim 1 further comprising in response to the determination of an n-gram being a valid entity:
   verifying further that additional valid-entities do not exist in the user-utterance; and
   upon validation, terminating the processing of the series of actions.

7. The method of claim 1 wherein the determining the n-gram to be verifiable further comprises, determining if the n-gram is linked with a subsequent n-gram as a multiple entity and in response to the determination that the n-gram is linked to the subsequent n-gram, the method further comprises, retrieving the subsequent n-gram from the n-gram sequence and further verifying the n-gram coupled with the subsequent n-gram to be a valid multiple entity.

8. The method of claim 1 wherein the entity-verifier is a verifier for an n-gram including one or more of a date, a denomination and a pronoun.

9. The method of claim 1 wherein the number of determined tokens of the user-utterance is limited to a maximum number of 30 tokens.

10. The method of claim 1, wherein in response to the entity assembler receiving one or more valid entities, the method further comprises, transmitting the one or more valid entities to a response system for discerning the meaning of the utterance.

11. A system for extracting verifiable entities from a user-utterance received on an automated calling service, the system comprising:
a receiver configured to receive a user-utterance;
a processor;
a non-transitory computer-readable media comprising computer-executable instructions which, when executed by the processor:
canonicalize the user-utterance into a plurality of tokens;
determine the number of tokens of the user-utterance;
generate, using a sliding-window protocol, a comprehensive number of n-gram sequences from the user-utterance, the number of n-gram sequences equal to the number of determined tokens, each n-gram sequence including a window-size equal to a value of n in the n-gram sequence;
retrieve a first n-gram from each n-gram sequence;
process, in parallel, a plurality of threads of execution, one thread of execution from the plurality of threads of execution for each n-gram sequence, the process of the plurality of threads of execution comprises a series of actions on the comprehensive n-gram sequences to:
determine the first n-gram or a subsequent n-gram to be verifiable, said verifiable to verify the n-gram as a noun;
in the event that the first n-gram or the subsequent n-gram is not determined to be verifiable, the processor is configured to retrieve the subsequent n-gram from each n-gram sequence and repeat the series of actions for the subsequent n-gram;
search, in a database of stored entity-verifiers, for an entity-verifier associated with the verified n-gram;
in the event that an entity-verifier associated with the verified n-gram is not found in the database, the processor is configured to retrieve the subsequent n-gram from each n-gram sequence and repeat the series of actions on the subsequent n-gram;
invoke the entity-verifier on the verified n-gram to determine the n-gram to be a valid entity;
in the event that the n-gram is not determined to be a valid entity, the processor is configured to retrieve the subsequent n-gram from each n-gram sequence and repeat the series of actions on the subsequent n-gram; and
transmit the valid entity to an entity assembler.

12. The system of claim 11 wherein the noun is a pronoun.

13. The system of claim 11 wherein the number of determined tokens of the user-utterance is limited to a maximum number of 30 tokens.

14. The system of claim 13 wherein, when the number of determined tokens of the user-utterance exceeds the maximum number, the system further comprises a transceiver configured to transmit a request to a user to repeat and reduce the user-utterance and further configured to receive the repeated user-utterance.

15. The system of claim 11 wherein the comprehensive n-gram sequences comprises a unigram sequence, a bigram sequence and a trigram sequence.

16. The system of claim 11 further comprising an n-gram sequence where an n-gram value of the n-gram sequence is equal to the determined number of tokens in the user-utterance.

17. The system of claim 11 wherein, in response to the determination of an n-gram being a valid entity, the processor is further configured to:
verify further that additional valid-entities do not exist in the user-utterance; and
upon validation, terminate the process of the series of actions.

18. The system of claim 11 wherein, in response to the determination that the n-gram is verifiable, the processor is further configured to determine if the n-gram is linked with a subsequent n-gram as a multiple entity and in response to the determination that the n-gram is linked to the subsequent n-gram, the processor is further configured to retrieve the subsequent n-gram from the n-gram sequence and further verify the n-gram coupled with the subsequent n-gram to be a valid multiple entity.

19. The system of claim 11 wherein the entity-verifier is a verifier for an n-gram, and said entity verifier comprises at least one of a date, a denomination and a pronoun.

20. The system of claim 11, wherein, in response to the entity assembler receiving one or more valid entities, the system is further configured to transmit the one or more valid entities to a response system for discerning the meaning of the utterance.

* * * * *